Aug. 17, 1943.    J. B. McGAY    2,327,121
TIME CYCLE CONTROLLER
Filed July 19, 1941    3 Sheets—Sheet 1
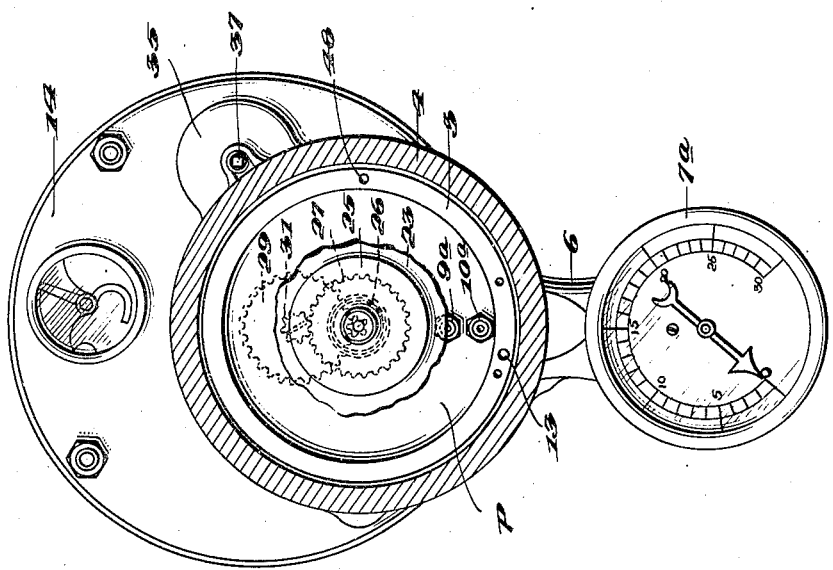
Inventor
JOHN B. McGAY,
By
Attorneys Aug. 17, 1943.   J. B. McGAY   2,327,121
TIME CYCLE CONTROLLER
Filed July 19, 1941   3 Sheets-Sheet 2
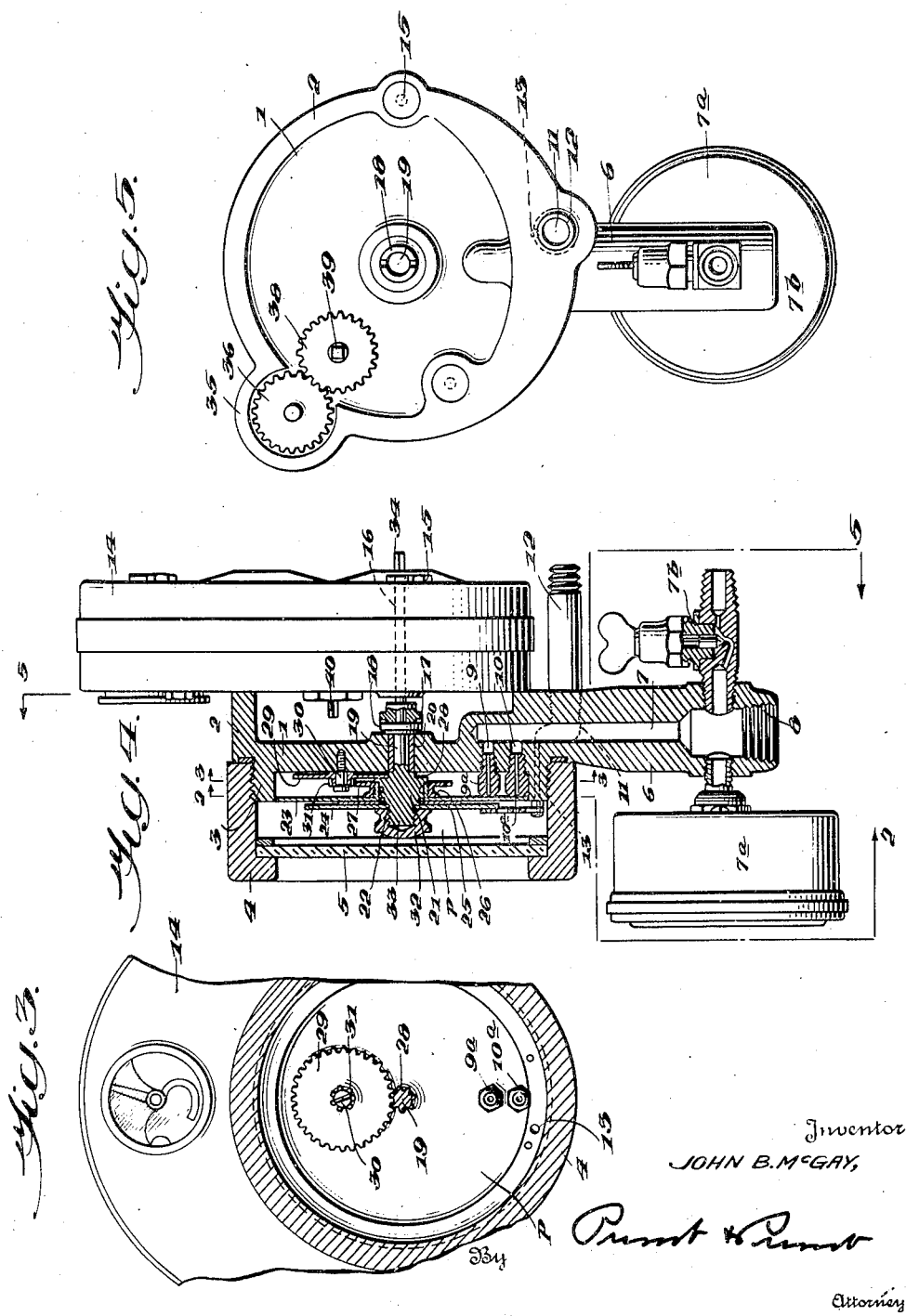
Inventor
JOHN B. McGAY,
By
Attorneys Aug. 17, 1943.  J. B. McGAY  2,327,121
TIME CYCLE CONTROLLER
Filed July 19, 1941   3 Sheets-Sheet 3
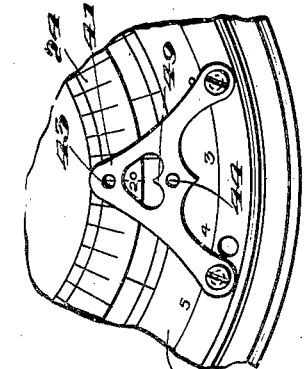
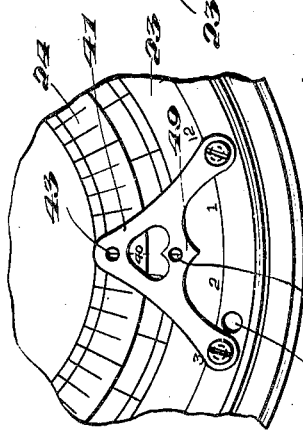
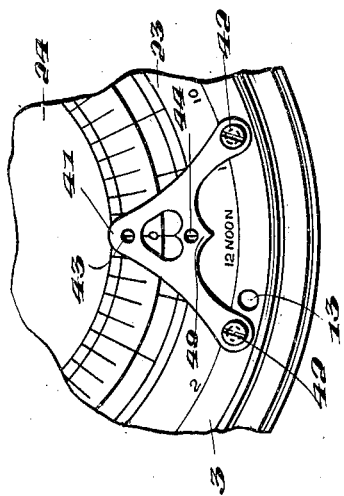
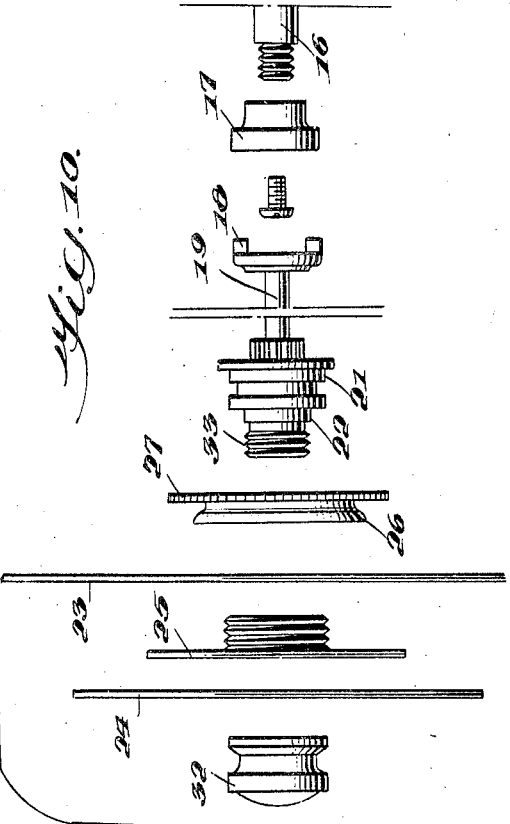
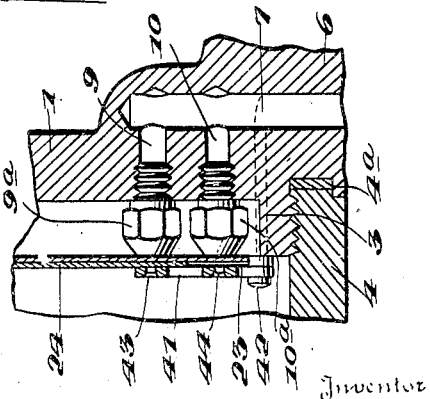
Inventor
JOHN B. McGAY,
By
Attorneys Patented Aug. 17, 1943

2,327,121

UNITED STATES PATENT OFFICE 2,327,121

TIME CYCLE CONTROLLER

John B. McGay, Tulsa, Okla., assignor to Hanlon-Waters, Inc., Tulsa, Okla.

Application July 19, 1941, Serial No. 403,221

13 Claims. (Cl. 161—1)

My invention consists in new and useful improvements in a time control mechanism for use in connection with fluid-pressure operated valves and has for its object to provide a timing device for automatically and intermittently permitting the flow of fluid operating medium under pressure to the diaphragm chamber or other pressure responsive actuating unit of a motor valve or the like.

In many industries, particularly the petroleum oil industry, it is necessary to operate valves in various types of apparatus and in flow lines leading from oil wells, at predetermined time intervals and for varying lengths of time over a period of twenty-four hours. Heretofore this operation has been accomplished either by hand or by the use of complicated and often unreliable devices which required constant supervision to insure the maintenance of the prescribed schedule.

It is therefore the primary object of my invention to overcome the disadvantages inherent in the present so-called automatic controls and to provide a timing device which is compact and extremely simple in construction and operation, yet accurate and reliable for the most minute control of pressure responsive mechanisms.

Another object of my invention is to provide a timing device which may be manually adjusted and set so as to control the periodic opening or closing of a remotely located pilot valve or the like at selected intervals and for predetermined periods over any given time cycle.

A further object of the present invention resides in the combination with a clock driven mechanism of a pair of discs composed of normally impervious, readily perforatable material such as paper, arranged in a pressure chamber, in vernier relation on a constantly rotating shaft, said discs lying over and engaging a fluid discharge port, and being provided with a series of perforations spaced at predetermined points in line for registry with said port, the perforations of respective discs being arranged to intermittently register with one another over said port as the discs rotate so as to open said port at selected time intervals and permit the flow of operating fluid to the pilot valve or the like under control.

A still further object of my invention is to provide means for punching perforations in the discs above referred to, and a guide member or frame cooperating with said punching means to insure the accurate perforation of the discs for proper alignment with the fluid port being controlled, said frame also serving to maintain a sliding engagement between the discs and said port.

Still another object of the invention is to provide a time control assembly consisting of a vernier-disc valve-timing unit and a detachable clock unit including means for transmitting the constant speed of rotation of a common shaft to separate, coaxial discs so as to cause said discs to rotate at regular, but relatively different, rates of speed. In the operation of my improved timing device, the relationship of a series of intermittently registering perforations in the respective discs, controls the periodic opening of a fluid port which leads to the valve or other pressure responsive mechanism under control.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Figure 1 is a plan view of the front of my improved assembly with the pressure ring or closure shown in section.

Fig. 2 is a similar view taken further back on the pressure ring, on line 2—2 of Fig. 4, Fig. 3 is a fragmentary sectional view taken on line 3—3 of Fig. 4, Fig. 4 is a sectional view at right angles to Fig. 1 and taken on line 4—4 thereof, Fig. 5 is a view taken on line 5—5 of Fig. 4 showing the timing unit from the rear with the clock unit removed, Figs. 6, 7 and 8 are enlarged fragmentary plan views showing different relative positions of the timing discs, Fig. 9 is a fragmentary sectional view taken on line 9—9 of Fig. 6, and Fig. 10 is an exploded view showing the drive shaft and disc mounting assembly.

In the drawings, I represents the main casting of my improved timing unit, provided with a rearwardly extending annular wall 2 and a forwardly extending reduced annular wall 3, the latter being threaded to accommodate a pressure ring or closure 4. The pressure ring 4 is preferably fitted with a relatively thick glass or other transparent lens member 5 and projects outwardly a suitable distance beyond the main casting to form a pressure chamber P which accommodates the intermittent control device as will hereinafter appear. In order to insure a tight seal, a pressure gasket 4a is interposed between the ring 4 and the base of the wall 3.

Integral with the casting 1 and extending downwardly therefrom is a support or stem 6 which is drilled longitudinally to form a fluid discharge conduit 7, the latter being threaded at its lower extremity 8 to receive a suitable connection leading to the diaphragm chamber or other pressure responsive operating unit of the pilot valve (not shown) to be controlled. The opposite end of said conduit 7 terminates within the casting 1, where it communicates with two transverse passageways 9 and 10 leading to the pressure chamber P. These passageways are threaded at their outer ends to receive ported discharge nipples 9a and 10a respectively which project outwardly from the casting 1 within the chamber P.

Adjacent its upper end, the stem 6 is transversely drilled and threaded as at 11, forming an opening to accommodate a connection 12, leading from a suitable source of operating fluid under pressure (not shown), said opening communicating with an inlet passage 13, extending through the forward wall 3 of the main casting and opening into the chamber P. The stem 6 is preferably provided with a suitable pressure gauge 7a and a lock shield needle valve 7b to facilitate the proper pressure regulation in the pressure line leading to the valve being controlled.

Thus when the device is installed with connection 12 in communication with a suitable source of operating pressure such as compressed air and with conduit 7 of the stem 6 in communication with the diaphragm chamber of a pilot valve to be controlled, fluid under a constant pressure is introduced through port 13 into chamber P from which it is discharged through either or both of the nipples 9a and 10a and conduit 7 to the pressure line leading to the diaphragm chamber of the pilot valve. As will hereinafter appear, the discharge through the nipples 9a and 10a is controlled by a pair of timing discs rotated by a clock motor of any suitable type, housed in a casing 14 and secured in place on the casting 1 by means of mounting screws 15 which engage threaded openings in the rearwardly extending annular wall 2 on the main casting 1.

A shaft 16, driven at a constant speed of rotation by the clock motor, terminates at its forward end in a drive nut 17, which, when the device is assembled, operatively engages an arbor 18 on the adjacent end of a coaxial disc-driving shaft 19, supported in a suitable stuffing box 20 mounted centrally in the main casting 1. The forward end of the shaft 19 carries a disc-drive assembly which consists of an enlarged hub 21 and a coaxial, reduced hub 22 immediately adjacent said enlarged hub.

A pair of discs composed of paper or other normally impervious material which may be readily penetrated by a suitable punching instrument, are arranged on the hub members in vernier relation. One of these discs 23 is preferably graduated and marked for a time cycle of twenty-four hours while the other disc 24 is smaller in diameter and graduated and marked for a time cycle of sixty minutes.

The twenty-four hour disc 23 is provided with a central opening to accommodate the hub 21 and is secured between a threaded flange member 25 and the shoulder 26 of a gear member 27, the entire assembly rotatably engaging the enlarged hub 21.

Immediately behind the hub member 21, the shaft 19 is provided with a pinion 28, arranged to engage the teeth of a gear 29 rotatably mounted on a stud 30 carried by the casting 1. In front of the gear 29, the stud 30 carries a pinion 31 which meshes with the teeth of the gear 27 on the twenty-four disc assembly. By this system of gearing, the constant speed of rotation of the shaft 19, which is driven at the rate of one complete revolution per hour, is transformed to cause the twenty-four hour disc 23 to make one complete revolution every twenty-four hours on the hub 21 although the latter is rotating at the rate of one revolution per hour.

The sixty minute disc 24 is also provided with a central opening to engage the reduced hub 22 and is held firmly in place by a threaded cap 32 which screws on to the threaded end 33 of the hub 22. Thus the disc 24 is caused to rotate with the shaft 19 and hub assembly at the rate of speed of one complete revolution per hour.

The rear end of the drive shaft 16 projects through the clock casing and terminates in a set square 34, adapted to receive a suitable key for setting and adjusting the timing discs as will be described hereafter.

Referring to Figs. 1 and 5, the wall 2 of the casting is provided with an extension 35 adapted to house a winding gear 36, the latter being provided with a winding square 37 which projects through the housing extension 35 and is adapted to receive a winding key. The gear 36 meshes with an adaptor gear 38 supported in the casting 1 and provided with a central squared opening 39 to receive the squared end 40 (Fig. 4) projecting from the clock casings and connected to the spring mechanism of the clock. Thus the rotation of the winding gear 36 causes the rotation of the adaptor gear 38 and through the squared connections 39—40 winds the clock mechanism.

As will best be seen in Figs. 6 to 9 inclusive, a substantially A-shaped frame 41 is secured to the front edge of the wall 3 by screws 42 engaging the lower extremities of the legs of the frame. At the apex of the frame, an aperture 43 lies directly in line with the port in discharge nipple 9a, while on the cross member of the frame, a second aperture 44 lies directly in line with the port in discharge nipple 10a. Spacers 45 are preferably interposed between the lower ends of the frame legs and the wall 3 so as to retain the frame at a proper spacing from the nipples 9a and 10a to permit the free rotation of the discs 23 and 24 therebetween, yet maintaining sliding contact between the discs and causing the innermost disc 23 to slidably engage the outer faces of the nipples, normally closing the same.

Any suitable means may be employed to perforate the discs 23 and 24 at the proper points to cause the selected intermittent opening of the ports in the nipples. However, I have found it practical and convenient to attach a special punching device 46 by means of a chain 47 secured to the cap 32. When not in use, the punch is inserted in an opening 48 in the front edge of the wall 3 (see Fig. 2).

To punch the discs, a suitable key is first placed on the set square 34 at the rear of the clock casing 14 and by turning the shaft 16 the discs are rotated to the proper positions indicated by the graduations on the faces of the discs, and the punch 46 is inserted in either or both of the openings 43 and 44 and pressed inwardly to perforate the discs at these points. As before pointed out, the openings 43 and 44 are in direct line for registry with the ports in nipples 9a and 10a respectively, thus causing the perforations to be made in registry with said ports.

The discs may be punched so as to cause the operation of the timing mechanism at various time intervals over any given time cycle. As an example, let us assume that it is desired to so set the device as to cause the motor valve to operate intermittently every hour and forty minutes over a period of twenty-four hours starting at noon. The operator would first remove the pressure ring 4 and then turn the discs until 12 noon on the disc 23 registers with the pointer 49 on the frame 41. He would then loosen the cap 32 and rotate the disc 24, now free on the shaft 19, until zero on said disc registers with the pointer, thereafter tightening the cap 32 to firmly secure the disc on the hub 21. Apertures are then punched in both discs in the manner aforesaid. The position thus far is illustrated in Fig. 6. The set key is then turned until disc 24 has been rotated one complete revolution and forty minutes of another revolution so that the numeral 40 coincides with pointer 49. Due to the vernier relation of the discs 23 and 24, this rotation has caused the disc 23 to rotate only a relatively slight distance bringing the same to register with the pointer 49 a distance past the one hour mark equal to forty minutes. This relationship is shown in Fig. 7. The discs are then punched as before.

The operator then continues to rotate the discs until the disc 24 has made another complete revolution and forty minutes on a second revolution which brings the numeral 20 adjacent the pointer 49. This has simultaneously caused the rotation of the disc 23, bringing the latter slightly past the numeral 3 in registry with the pointer 49, as shown in Fig. 8, whereupon the discs are again punched. This operation is repeated until the twenty-four hour disc 23 has made one complete revolution and the apparatus is then ready to begin its automatic intermittent control, after the pressure ring 4 has been screwed firmly in place on the wall 3.

One of the primary advantages of the vernier relation of the discs lies in the fact that it permits a minute adjustment of the discs for punching over a twenty-four hour schedule. It is apparent that without the cooperation of the sixty minute disc, it would be practically impossible to accurately gauge the proper positions on the twenty-four hour disc for perforations representing minutes.

The main purpose of the double nipple arrangement is to provide means for controlling the period of time during which it is desired to retain the pressure connection between the pressure chamber P and the diaphragm chamber of the motor valve. This is accomplished by punching an elongated opening in the discs through the guide aperture 43 so as to maintain an opening over the port of nipple 9a for the required length of time. As both nipples feed into the common conduit 7, it is apparent that the application of pressure to the diaphragm chamber will continue so long as either one of these nipples is open.

In installations which are to be controlled over a time cycle of one hour only, or on a purely hourly basis, the twenty-four hour disc 23 may be removed and a plugged nipple inserted in the passageway 10 in place of the ported nipple 10a. In this event, the timing would be controlled entirely by the arrangement of perforations in the sixty minute disc 24.

From the foregoing it is believed that the operation and advantages of my improved time control mechanism may be readily understood by those skilled in the art without further description, it being borne in mind that numerous changes may be made in the details of construction without departing from the spirit of the invention as set forth in the following claims.

What I claim and desire to secure by Letters Patent is:

1. A time control device for pressure responsive valves, comprising a housing forming a fluid chamber, a fluid inlet to said chamber, connected to a source of operating fluid under pressure, a fluid outlet port in said chamber, connected to the actuating member of the valve to be controlled, a shaft rotatably supported in said housing with one end extending into said chamber, a clock motor operatively connected to said shaft, a pair of coaxial discs arranged on said shaft and rotatable in vernier relation thereby, said discs overlying said outlet port and normally closing the same, and a series of concentric perforations in said discs, spaced at predetermined points in line for registry with said outlet port, the perforations of the respective discs being arranged to intermittently register with one another over said port as the discs rotate, to open said port at selected time intervals.

2. A time control device for pressure responsive valves, comprising a housing forming a fluid chamber, a port to admit fluid into said chamber, connected to a source of operating fluid under pressure, a port to discharge fluid from said chamber, connected to the actuating member of the valve to be controlled, a rotatable shaft having a portion in said housing and extending into said chamber, a clock motor operatively connected to said shaft for rotating the latter, a disc mounted on said shaft and blocking one of said ports to normally close the latter, said disc having perforations spaced at predetermined points in line for registry with said last mentioned port as the disc rotates, whereby said last mentioned port is intermittently opened at predetermined time intervals to permit the flow of operating fluid through said chamber to the actuating member of said valve, and a stationary guide member in said chamber holding said disc in contact with the last mentioned port.

3. A time control device for pressure responsive valves, comprising a housing forming a fluid chamber, a port to admit fluid into said chamber, connected to a source of operating fluid under pressure, a port to discharge fluid from said chamber, connected to the actuating member of the valve to be controlled, a rotatable shaft having a portion in said housing and extending into said chamber, a clock motor operatively connected to said shaft for rotating the latter, a disc mounted on said shaft and blocking one of said ports to normally close the latter, said disc having perforations spaced at predetermined points in line for registry with said last mentioned port as the disc rotates, whereby said last mentioned port is intermittently opened at predetermined time intervals to permit the flow of operating fluid through said chamber to the actuating member of said valve, and a stationary guide member in said chamber holding said disc in contact with the last mentioned port, said guide member having an aperture registering with said port.

4. A time control device for pressure responsive valves, comprising a housing forming a fluid chamber, a port to admit fluid into said chamber, connected to a source of operating fluid under pressure, a port to discharge fluid from said chamber, connected to the actuating member of the valve to be controlled, a rotatable shaft having a portion in said housing and extending into said chamber, a clock motor operatively connected to said shaft for rotating the latter, a disc of normally impervious readily perforatable material having perforations spaced at predetermined points in line for registry with said last mentioned port as the disc rotates, whereby said last mentioned port is intermittently opened at predetermined time intervals to permit the flow of operating fluid through said chamber to the actuating member of said valve, and a stationary guide member in said chamber holding said disc in contact with the last mentioned port.

5. A time control device for pressure responsive valves, comprising a housing forming a fluid chamber, a port to admit fluid into said chamber, connected to a source of operating fluid under pressure, a port to discharge fluid from said chamber, connected to the actuating member of the valve to be controlled, a rotatable shaft having a portion in said housing and extending into said chamber, a clock motor operatively connected to said shaft for rotating the latter, a pair of coaxial discs arranged on said shaft and rotatable in vernier relation thereby, said discs blocking one of said ports and normally closing the same, and a series of concentric perforations in said discs, spaced at predetermined points in line for registry with said last mentioned port, the perforations of the respective discs being arranged to intermittently register with one another at said last mentioned port as the discs rotate, to open the latter at selected time intervals.

6. A time control device for pressure responsive valves, comprising a housing forming a fluid chamber, a port to admit fluid into said chamber, connected to a source of operating fluid under pressure, a port to discharge fluid from said chamber, connected to the actuating member of the valve to be controlled, a rotatable shaft having a portion in said housing and extending into said chamber, a clock motor operatively connected to said shaft for rotating the latter, a pair of coaxial discs arranged on said shaft and rotatable in vernier relation thereby, said discs blocking one of said ports and normally closing the same, each disc being provided with series of concentric perforations spaced at predetermined points in line for registry with the last mentioned port, the perforations of the respective discs being arranged to intermittently register with one another at said last mentioned port as the discs rotate to open said last mentioned port at selected time intervals, and an apertured frame member frictionally engaging at least one of said discs adjacent said last mentioned port for maintaining sliding contact between said discs and between the innermost disc and said last mentioned port.

7. A time control device for pressure responsive valves, comprising a housing forming a fluid chamber, a port to admit fluid into said chamber, connected to a source of operating fluid under pressure, a port to discharge fluid from said chamber, connected to the actuating member of the valve to be controlled, a rotatable shaft having a portion in said housing extending into said chamber, a clock motor operatively connected to said shaft for rotating the latter, a pair of coaxial discs arranged on said shaft and rotatable in vernier relation thereby, said discs blocking one of said ports and normally closing the same, each disc being provided with series of concentric perforations spaced at predetermined points in line for registry with the last mentioned port, the perforations of the respective discs being arranged to intermittently register with one another at said last mentioned port as the discs rotate to open said last mentioned port at selected time intervals, an apertured frame member frictionally engaging at least one of said discs adjacent said last mentioned port for maintaining sliding contact between said discs and between the innermost disc and said last mentioned port, and an indicator on said frame adjacent to said last mentioned port, said frame member having an aperture registering with the last mentioned port.

8. A time control device for pressure responsive valves, comprising a housing forming a fluid chamber, a port to admit fluid into said chamber, connected to a source of operating fluid under pressure, a port to discharge fluid from said chamber, connected to the actuating member of the valve to be controlled, a nipple communicating with one of said ports and projecting into said chamber, a rotatable shaft having a portion extending into said chamber, a clock motor operatively connected to the shaft for continuously rotating the latter, a disc mounted on said shaft and blocking said nipple for normally closing the latter, said disc having perforations spaced at predetermined points in line for registry with said nipple as the disc rotates, whereby said nipple is intermittently opened at predetermined time intervals to permit the flow of operating fluid through said chamber to the actuating member of said valve, and stationary means in the chamber for causing the disc to maintain sliding contact with said nipple.

9. A time control device for pressure responsive valves, comprising a housing forming a fluid chamber, a port to admit fluid into said chamber, connected to a source of operating fluid under pressure, a plurality of nipples projecting into said chamber and adapted to be connected to the actuating member of the valve to be controlled, a rotatable shaft having a portion arranged in said chamber, a clock motor operatively connected to the shaft for rotating the latter, a plurality of coaxial discs on said shaft and rotatable in vernier relation thereby, said discs blocking said nipples and normally closing the same, and series of concentric perforations in said discs, spaced at predetermined points in lines for registry with said nipples, the perforations of the respective discs being arranged to intermittently register with one another at said nipples as the discs rotate, to open said nipples at selected time intervals.

10. A time control device as claimed in claim 1, including means for manually rotating said discs to set their timing relation.

11. A time control device as claimed in claim 1, in which perforations of the discs are elongated so as to effect prolonged fluid discharge from said chamber to the motor valve.

12. A selective time control device for intermittently opening and closing an orifice, including a chamber for fluid under pressure communicating with said orifice, a rotatable disc in the chamber blocking said orifice and normally closing the same, a clock motor operatively connected to said disc for rotating the latter at a constant speed, a window through which the interior of the chamber and the disc may be viewed, a series of ports in said disc in line for registry with said orifice as the disc rotates, and means for manually rotating said disc.

13. In a device of the character described, a housing, a port in the housing, a rotatable disc in the housing normally blocking the port and formed of readily perforatable material, means for maintaining sliding contact between the disc and port as the disc rotates, and a second port in said means registering with the first mentioned port to facilitate punching the disc.

JOHN B. McGAY.